United States Patent
Borlick et al.

(10) Patent No.: US 10,691,609 B2
(45) Date of Patent: Jun. 23, 2020

(54) CONCURRENT DATA ERASURE AND REPLACEMENT OF PROCESSORS

(71) Applicant: International Business Machines Corporation, Armonk, NY (US)

(72) Inventors: Matthew G. Borlick, Tucson, AZ (US); Lokesh M. Gupta, Tucson, AZ (US); Clint A. Hardy, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 15/657,546

(22) Filed: Jul. 24, 2017

(65) Prior Publication Data

US 2019/0026229 A1  Jan. 24, 2019

(51) Int. Cl.
| | |
|---|---|
| *G06F 12/0891* | (2016.01) |
| *G06F 12/0806* | (2016.01) |
| *G06F 9/48* | (2006.01) |
| *G06F 9/50* | (2006.01) |
| *G06F 11/00* | (2006.01) |
| *G06F 12/14* | (2006.01) |
| *G06F 12/0804* | (2016.01) |

(52) U.S. Cl.
CPC ........ *G06F 12/0891* (2013.01); *G06F 9/4843* (2013.01); *G06F 9/5061* (2013.01); *G06F 11/00* (2013.01); *G06F 12/0806* (2013.01); *G06F 12/0804* (2013.01); *G06F 12/1408* (2013.01); *G06F 2209/505* (2013.01); *G06F 2212/1052* (2013.01); *G06F 2212/62* (2013.01)

(58) Field of Classification Search
CPC .................................................. G06F 12/0891
USPC .......................................................... 711/135
See application file for complete search history.

(56) References Cited

U.S. PATENT DOCUMENTS

| | | | |
|---|---|---|---|
| 6,378,027 B1 * | 4/2002 | Bealkowski | ........ G06F 13/4072 709/223 |
| 6,516,429 B1 * | 2/2003 | Bossen | ................. G06F 11/004 714/10 |
| 7,870,343 B2 | 1/2011 | Blumrich et al. | |
| 8,620,054 B2 | 12/2013 | Leroux et al. | |
| 9,183,156 B2 | 11/2015 | McKenney | |
| 9,251,071 B2 | 2/2016 | Pizlo | |

(Continued)

*Primary Examiner* — Gautam Sain
(74) *Attorney, Agent, or Firm* — Nelson and Nelson; Daniel P. Nelson; Alexis V. Nelson (57) ABSTRACT

A method for concurrently erasing data on a processor and preparing the processor for removal from a computing system is disclosed. In one embodiment, such a method includes determining tasks queued to be executed on a processor and reassigning the tasks to a different processor, such as to a different processor in the same cluster as the processor. The method further prevents new tasks from being assigned to the processor. The method waits for currently executing tasks on the processor to complete. Once the currently executing tasks are complete, the method initiates a cache-hostile job on the processor to evict entries in cache of the processor. Once the cache-hostile job is complete, the method enables the processor to be removed from a computing system such as a storage system controller. A corresponding system and computer program product are also disclosed.

14 Claims, 7 Drawing Sheets

(56) References Cited

U.S. PATENT DOCUMENTS

| | | | |
|---|---|---|---|
| 2010/0205367 A1* | 8/2010 | Ehrlich | G06F 12/0804 |
| | | | 711/113 |
| 2010/0217952 A1* | 8/2010 | Iyer | G06F 12/0897 |
| | | | 711/209 |
| 2012/0198160 A1* | 8/2012 | Chachad | H03K 19/0016 |
| | | | 711/122 |
| 2014/0089596 A1* | 3/2014 | McKenney | G06F 12/0891 |
| | | | 711/135 |
| 2014/0359226 A1* | 12/2014 | Pan | G06F 12/0873 |
| | | | 711/135 |
| 2015/0106609 A1 | 4/2015 | Koszek | |

* cited by examiner

CONCURRENT DATA ERASURE AND REPLACEMENT OF PROCESSORS

BACKGROUND

Field of the Invention

This invention relates to systems and methods for replacing and securely erasing data from processors.

Background of the Invention

When disk drives or other data storage drives (e.g., solid state drives) are removed or discarded from a storage system, data may be wiped from the drives to ensure that it doesn't fall into unauthorized hands. Various utilities, such as Secure Data Override (SDO), may be used to securely erase data on disk drives that are being removed from a storage system. If data is not securely erased, but is only deleted from the point of view of an operating system, the data may be recovered using file recovery software. Data erasure utilities, by contrast, truly erase data on underlying storage media. A data erasure utility such as SDO utilizes one or more data sanitization methods that can permanently overwrite data on a storage drive.

Although utilities are available to securely erase data from storage drives such as disk drives or solid state drives, secure data may reside on other components of a storage system such as processors, host adapters, device adapters, memory cards or chips, and the like. These devices may also need to be removed and/or discarded from a storage system from time to time. Thus, the possibility exists that secure data may be recovered from these devices if not erased properly.

With some types of devices, it is relatively easy to erase data. With other types of devices, however, it is more difficult and may require utilities that do not presently exist. For example, processors may store secure data in their L1, L2, and/or L3 caches. Presently, no utilities exist to securely erase data in these caches. Techniques such as causing a processor to read zeros will typically not flush data from processor caches.

In view of the foregoing, what are needed are systems and methods to securely erase residual data from processors. Such systems and methods will ideally flush data from a processor's cache. Further needed are systems and methods to enable a processor to be flushed of secure data and replaced without taking down a cluster to which the processor belongs.

SUMMARY

The invention has been developed in response to the present state of the art and, in particular, in response to the problems and needs in the art that have not yet been fully solved by currently available systems and methods. Accordingly, systems and methods are disclosed to concurrently erase data on a processor and prepare the processor for removal from a computing system. The features and advantages of the invention will become more fully apparent from the following description and appended claims, or may be learned by practice of the invention as set forth hereinafter.

Consistent with the foregoing, a method for concurrently erasing data on a processor and preparing the processor for removal from a computing system is disclosed. In one embodiment, such a method includes determining tasks queued to be executed on a processor and reassigning the tasks to a different processor, such as to a different processor in the same cluster as the processor. The method further prevents new tasks from being assigned to the processor. The method waits for currently executing tasks on the processor to complete. Once the currently executing tasks are complete, the method initiates a cache-hostile job on the processor to evict entries in cache of the processor. Once the cache-hostile job is complete, the method enables the processor to be removed from a computing system such as a storage system controller.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
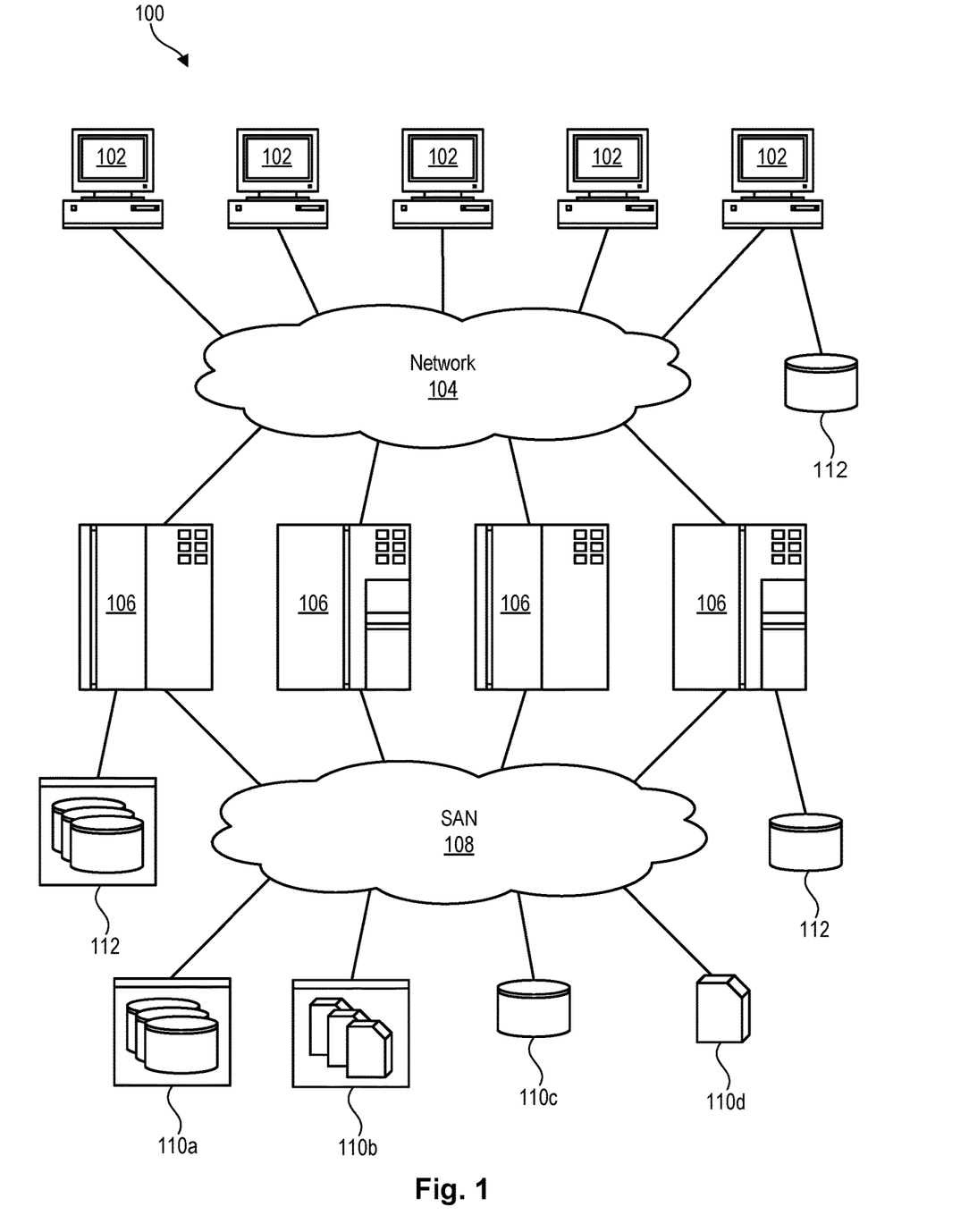
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
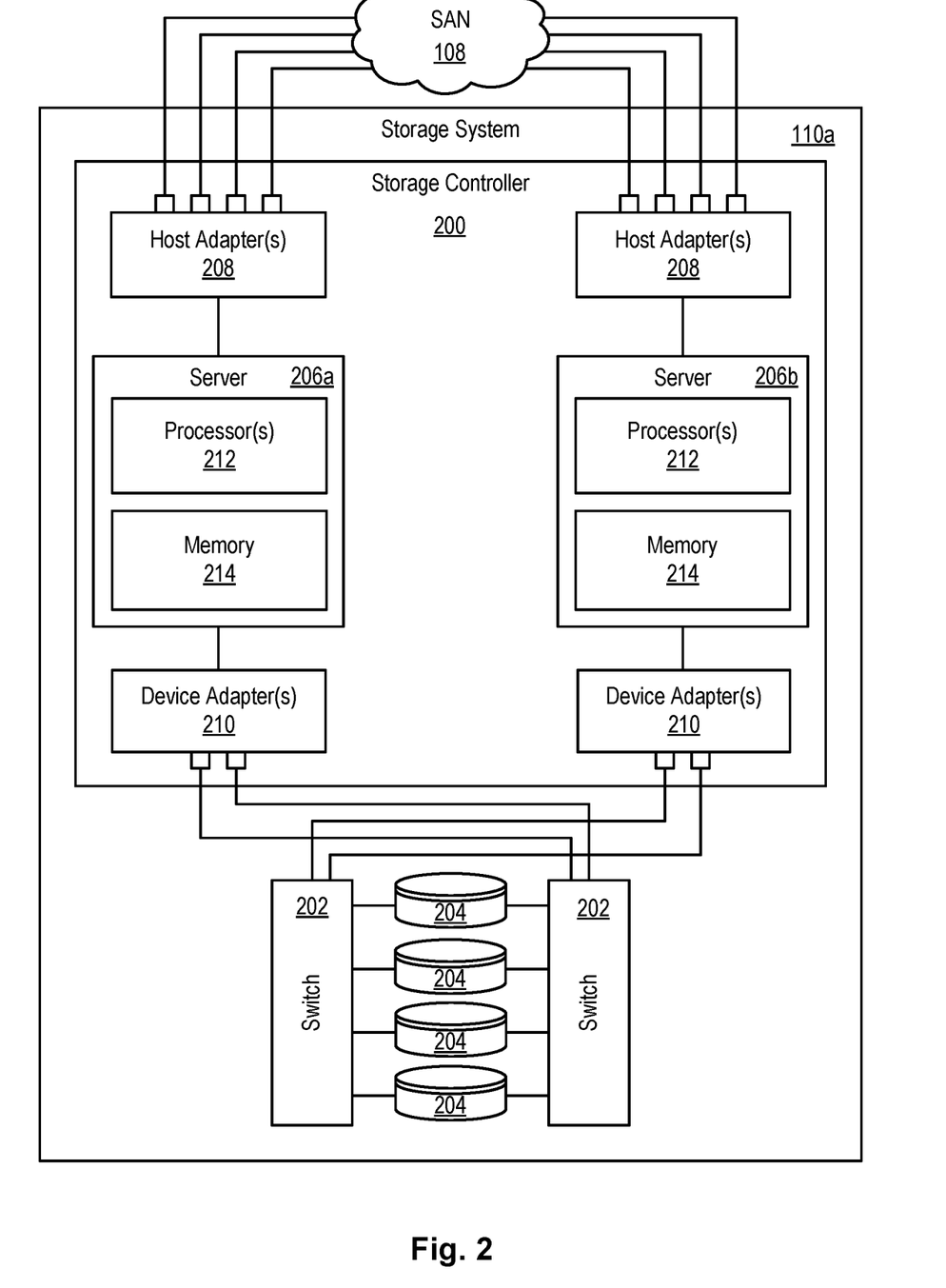
FIG. 2 is a high-level block diagram showing one example of a storage system in which a system and method in accordance with the invention may be implemented.

Referring to FIG. 2, one embodiment of a storage system 110a containing an array of hard-disk drives 204 and/or solid-state drives 204 is illustrated. The internal components of the storage system 110a are shown since such a storage system 110a may implement the systems and methods disclosed herein. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. These software modules may manage all read and write requests to logical volumes in the storage devices 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
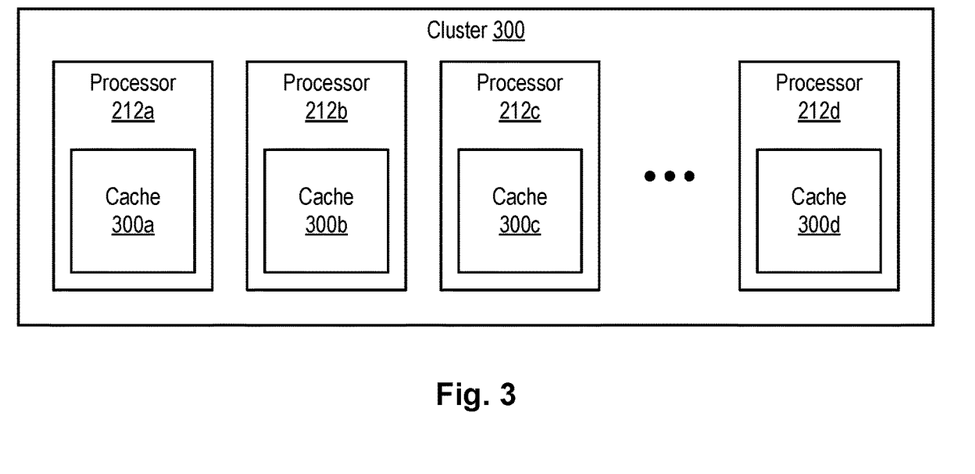
FIG. 3 is a high-level block diagram showing a cluster of processors.

Referring to FIG. 3, as previously mentioned, when disk drives 204 or other data storage drives 204 (e.g., solid state drives) are removed or discarded from a storage system 110 such as that illustrated in FIG. 2, data may be wiped from the drives 204 to ensure that it doesn't fall into unauthorized hands. Various utilities, such as Secure Data Override (SDO), may be used to securely erase data on disk drives 204 that are being removed from a storage system 110. If data is not securely erased, but is only deleted from the point of view of an operating system, the data can often be recovered using file recovery software. Data erasure utilities, by contrast, truly erase data on underlying storage media. A data erasure utility such as SDO utilizes one or more data sanitization methods that can permanently overwrite data on a storage drive 204.

Although data may be securely erased from storage drives 204 such as disk drives 204 or solid state drives 204, residual data may still exist on other components of a storage system 110 such as processors 212, host adapters 208, device adapters 210, memory cards 214 or chips 214, or the like. These devices may also need to be removed and/or discarded from a storage system 110 from time to time. Thus, the possibility exists that secure data may be recovered from these devices and accessed by unauthorized individuals.

With some types of devices, it is relatively easy to erase data. With other types of devices, however, it is more difficult and may require utilities that do not presently exist. For example, processors 212 may store secure data in their L1, L2, and L3 caches 300. Presently, no utilities exist to securely erase data on the cache 300 of such processors 212. Having a processor 212 read zeros will not flush processor caches 300.

In view of the foregoing, systems and methods are needed to securely erase residual data from processors 212. Such systems and methods will ideally flush data from a processor's cache 300. Further, as shown in FIG. 3, processors 212 in a storage controller or other computing system may in certain embodiments be coupled together in a cluster 300 or processor complex 300. Systems and methods are needed to enable a processor 212 to be flushed of secure data and replaced without taking down a cluster 300 to which the processor 212 belongs.

Figure 4:
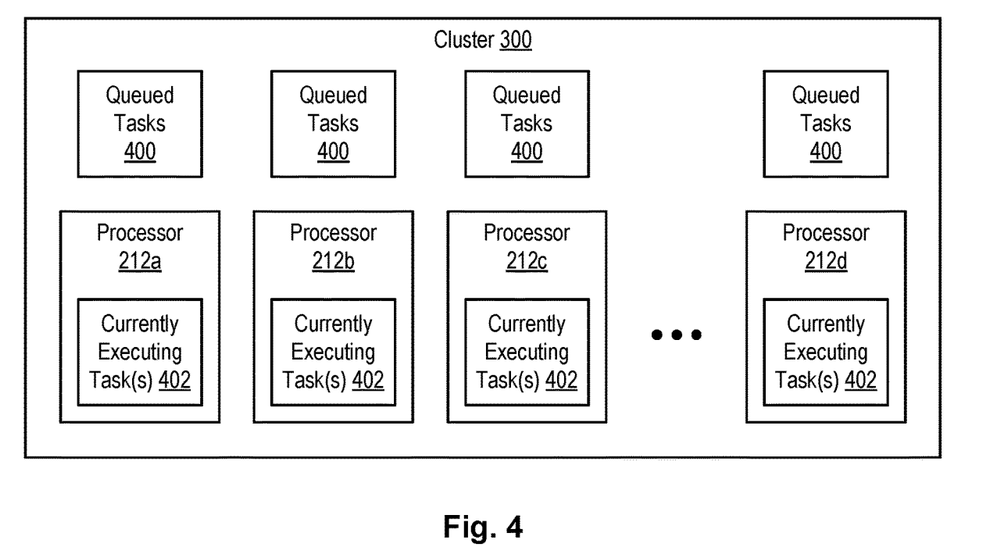
FIG. 4 is a high-level block diagram showing assignment of tasks to processors in the cluster.

Referring to FIG. 4, in certain embodiments, a processor 212 in a cluster 300 may have tasks 402 that are currently executing on the processor 212 and a queue of tasks 400 that are waiting to be scheduled on the processor 212. This may be true for each processor 212 in the cluster 300. In order to replace a processor 212 in the cluster 300 as well as remove potentially sensitive data that may reside within the processor 212, a system administrator may indicate, to microcode that runs on the cluster 300, a processor 212 in the cluster 300 to be replaced. This may be performed through a console or utility that runs in association with the cluster 300.

Figure 5:
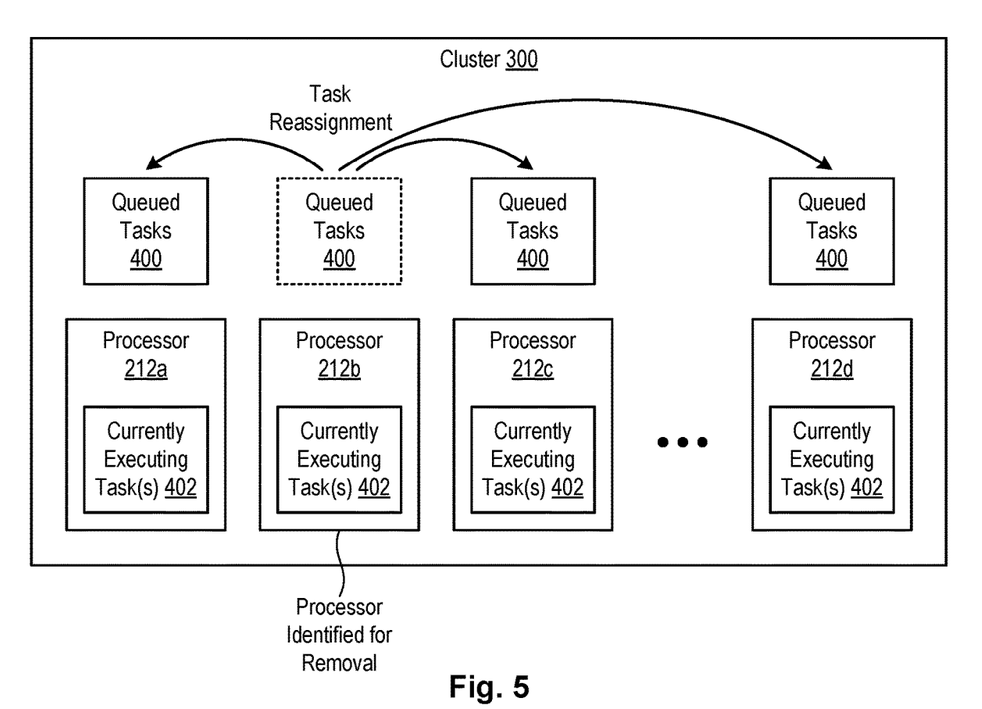
FIG. 5 is a high-level block diagram showing re-assignment of tasks to other processors in the cluster in preparation to remove a processor.

Referring to FIG. 5, in response to the indication from the system administrator, the microcode in the cluster 300 may locate the processor 212 that needs to be replaced as well as any queues of tasks 400 waiting to be executed on the processor 212. Assume, for the sake of example, that processor 212b is to be replaced. The microcode may then remove queued tasks 400 and reassign the tasks to other processors 212 within the cluster 300. Meanwhile, the microcode may prevent any further tasks from being assigned to the processor 212b that is identified for removal. The microcode may wait for any currently executing tasks 402 to finish executing on the processor 212b.

Once currently executing tasks 402 have finished executing on the processor 212b, the microcode may initiate a cache-hostile job on the processor 212b. One example of a cache-hostile job will be described in association with FIG. 7. In general, the cache-hostile job may perform operations on the processor 212b that will flush residual data from the cache of the processor 212b. Because program code may not have direct access to cache of a processor 212, and thus may be unable to directly remove or overwrite data in the cache, the cache-hostile job may perform operations that intensively utilize the cache and replace data currently in the cache using the processor's internal cache-eviction algorithms. In certain embodiments, the cache-hostile job is executed for a selected amount of time to ensure that secure data is adequately removed from the cache. Once the cache of the processor 212b is adequately scrubbed of secure data, the processor 212b may be physically removed from the cluster 300. The cluster 300 may remain up and running during this removal.

Figure 6:
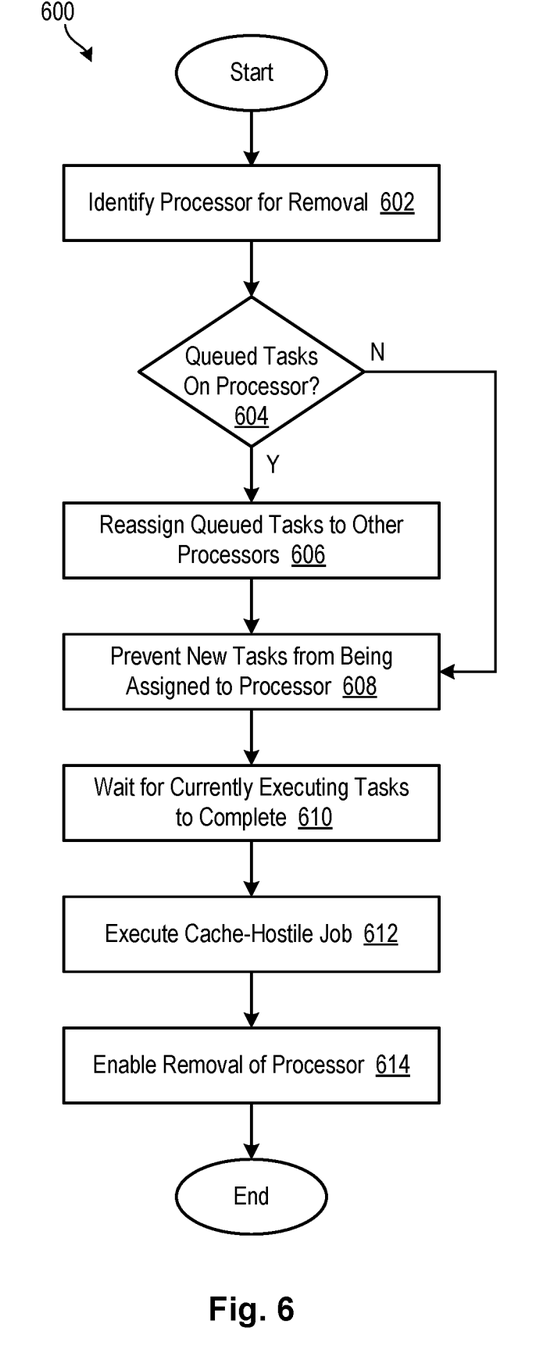
FIG. 6 is a process flow diagram showing a method for erasing data on a processor and preparing the processor for removal from a computing system.

Referring to FIG. 6, one embodiment of a method 600 for removing and erasing data on a processor 212b is illustrated. As shown, the method 600 initially identifies 602 a processor 212b for removal from a computing system such as a storage controller 200. As previously mentioned, such identification may be accomplished by way of a console or utility associated with the computing system. More specifically, a system administrator may identify, through the console or utility, the processor 212b to be removed. Alternatively, the computing system itself may identify the processor 212b, such as by identifying a processor 212 that is failing or requires maintenance.

The method 600 then determines 604 whether any tasks are queued and waiting for execution on the processor 212b identified for removal. If not, the method 600 skips step 606 and proceeds to step 608. If so, the method 600 reassigns 606 the queued tasks to other processors 212 for execution thereon. These other processors 212 may, in certain embodiments, reside in the same cluster 300 as the processor 212b identified for removal.

Meanwhile, the method 600 prevents 608 new tasks from being assigned to the processor 212b identified for removal. The method 600 also waits 610 for any currently executing tasks 402 to finish executing on the processor 212b.

Once currently executing tasks 402 have finished executing, the method 600, executes 612 a cache-hostile job on the processor 212b identified for removal. One embodiment of a method 700 that may be executed by the cache-hostile job will be discussed in association with FIG. 7. As previously mentioned, this cache-hostile job may perform operations on the processor 212b that utilize the processor's internal cache extensively and thus are effective to flush residual data from the cache. In certain embodiments, this cache-hostile job may be executed for a selected amount of time to adequately flush data from the processor's cache.

Once the cache-hostile job has completed, the method 600 may allow 614 the physical removal of the processor 212b from the computing system, and more particularly from the cluster 300 to which the processor 212b belongs. Because the tasks of the processor 212b have been reassigned to other processors 212 in the cluster 300, the processor 212b may be removed without shutting down the cluster 300. This ensures minimal impact to the performance of the computing system (e.g., storage controller) while the processor 212b is being replaced.

Figure 7:
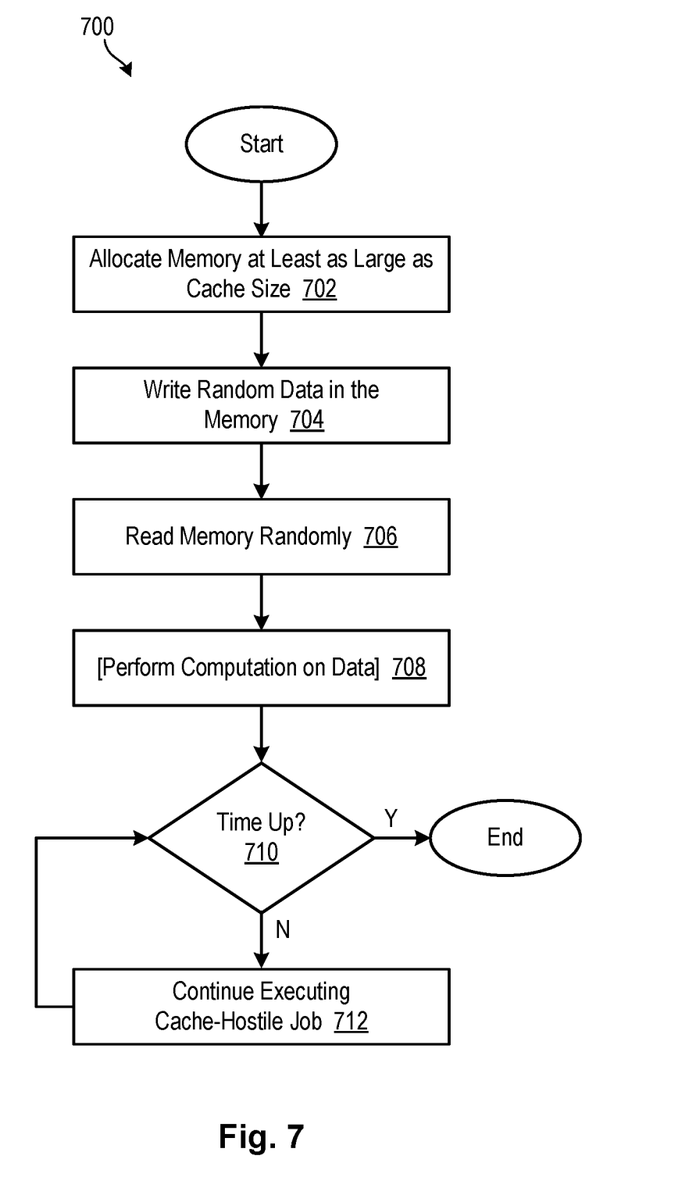
FIG. 7 is a process flow diagram showing one example of a method that may be executed by a cache-hostile job.

Referring to FIG. 7, one embodiment a method 700 that may be executed by a cache-hostile job is shown. As shown, the method 700 initially allocates 702 memory (possibly in the memory devices 214 illustrated in FIG. 2) that is at least as large as the cache that is being flushed of data. The method 700 then writes 704 random data to the allocated memory. For example, the method 700 may use a random number generator to generate random numbers and write 704 to the allocated memory sequentially with the random numbers.

The method 700 then reads 706 the data in the allocated memory randomly using a random number generator. The random number generator may, in certain embodiments, generate a random address and the method 700 may read 706 the memory at the random address.

In certain embodiments, when reading the data from memory, the method 700 may perform some computation on the data that is being read, such as addition, subtraction, multiplication, division, or the like. This computation may, in certain embodiments, incur additional cache usage which may in turn help to flush data from the processor's cache.

As previously mentioned, the cache-hostile job may be executed for a selected amount of time to flush data from the processor's cache. This amount of time may depend on the size of the processor's cache, as well as characteristics of the processor 212b such as the clock speed or operations per time period of the processor 212b. These characteristics may affect the amount of time needed to flush the cache. Thus, in certain embodiments, the method 700 may determine 710 whether the selected amount of time to run the cache-hostile job has elapsed. If not, the method 700 may continue 712 executing the cache-hostile job. If the time has elapsed, the method 700 may end.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for concurrently erasing data on an identified processor and preparing the identified processor for removal from a computing system, the method comprising:
   logically removing the identified processor from a cluster of processors as follows:
     determining tasks queued to be executed on the identified processor;
     reassigning the tasks to a different processor from the identified processor, wherein the different processor is also from the cluster; and
     preventing new tasks from being assigned to the identified processor;
   after logically removing the identified processor from the cluster of processors and completing any currently executing tasks on the identified processor, initiating a cache-hostile job on the identified processor to replace entries in cache of the identified processor;
   executing the cache-hostile job for an amount of time selected to ensure that the entries are adequately replaced, wherein the amount of time is tailored to a size of the cache; and
   once the cache-hostile job is complete, physically removing the identified processor from the cluster.

2. The method of claim 1, wherein the cluster is implemented within a storage controller.

3. The method of claim 1, wherein the cache-hostile job allocates an amount of memory at least as large as the cache.

4. The method of claim 1, wherein the cache-hostile job performs at least one of: randomly writing to the memory; randomly reading from the memory; and performing a computation on data in the memory.

5. The method of claim 1, wherein the cache-hostile job replaces the entries using an internal cache-eviction algorithm of the identified processor.

6. A computer program product for concurrently erasing data on an identified processor and preparing the identified processor for removal from a computing system, the computer program product comprising a non-transitory computer-readable storage medium having computer-usable program code embodied therein, the computer-usable program code configured to perform the following when executed by at least one processor:
   logically remove the identified processor from a cluster of processors as follows:
      determine tasks queued to be executed on the identified processor;
      reassign the tasks to a different processor from the identified processor, wherein the different processor is also from the cluster; and
      prevent new tasks from being assigned to the identified processor;
   after logically removing the identified processor from the cluster of processors and completing any currently executing tasks on the identified processor, initiate a cache-hostile job on the identified processor to replace entries in cache of the identified processor;
   execute the cache-hostile job for an amount of time selected to ensure that the entries are adequately replaced, wherein the amount of time is tailored to a size of the cache; and
   once the cache-hostile job is complete, enable physical removal of the identified processor from the cluster.

7. The computer program product of claim 6, wherein the cluster is implemented within a storage controller.

8. The computer program product of claim 6, wherein the cache-hostile job allocates an amount of memory at least as large as the cache.

9. The computer program product of claim 6, wherein the cache-hostile job performs at least one of: randomly writing to the memory; randomly reading from the memory; and performing a computation on data in the memory.

10. The computer program product of claim 6, wherein the cache-hostile job replaces the entries using an internal cache-eviction algorithm of the identified processor.

11. A system for concurrently erasing data on an identified processor and preparing the identified processor for removal from a computing system, the system comprising:
   at least one processor;
   at least one memory device operably coupled to the at least one processor and storing instructions for execution on the at least one processor, the instructions causing the at least one processor to:
      logically remove the identified processor from a cluster of processors as follows:
         determine tasks queued to be executed on an identified processor belonging to a cluster of processors;
         reassign the tasks to a different processor from the identified processor, wherein the different processor is also from the cluster; and
         prevent new tasks from being assigned to the identified processor;
      after logically removing the identified processor from the cluster of processors and completing any currently executing tasks on the identified processor, initiate a cache-hostile job on the identified processor to replace entries in cache of the identified processor;
      execute the cache-hostile job for an amount of time selected to ensure that the entries are adequately replaced, wherein the amount of time is tailored to a size of the cache; and
      once the cache-hostile job is complete, enable physical removal of the identified processor from the cluster.

12. The system of claim 11, wherein the cluster is implemented within a storage controller.

13. The system of claim 11, wherein the cache-hostile job allocates an amount of memory at least as large as the cache.

14. The system of claim 11, wherein the cache-hostile job replaces the entries using an internal cache-eviction algorithm of the identified processor.

* * * * *